United States Patent
Lemke

(10) Patent No.: US 7,557,296 B2
(45) Date of Patent: Jul. 7, 2009

(54) METHOD AND APPARATUS FOR ELECTRICAL BOX REPAIR COVER

(76) Inventor: Scott L. Lemke, 5816 Hickory Dr., Apt. H, Oak Park, CA (US) 91377

( * ) Notice: Subject to any disclaimer, the term of this patent is extended or adjusted under 35 U.S.C. 154(b) by 0 days.

(21) Appl. No.: 11/697,910

(22) Filed: Apr. 9, 2007

(65) Prior Publication Data

US 2007/0235204 A1 Oct. 11, 2007

Related U.S. Application Data

(60) Provisional application No. 60/744,584, filed on Apr. 10, 2006.

(51) Int. Cl.
H02G 3/08 (2006.01)

(52) U.S. Cl. .............. 174/50; 174/53; 174/58; 174/66; 220/3.2; 220/3.8; 248/906

(58) Field of Classification Search .......... 174/50, 174/53, 57, 58, 480, 481, 487, 66, 67, 503; 220/3.2–3.9, 4.02, 241, 242; 248/906; D18/152; 439/535, 536, 537, 538
See application file for complete search history.

(56) References Cited

U.S. PATENT DOCUMENTS

| | | | |
|---|---|---|---|
| 4,652,023 A | 3/1987 | Timmons | |
| 5,021,616 A | 6/1991 | Hardt | |
| 5,117,996 A * | 6/1992 | McShane | 174/57 |
| 5,239,129 A | 8/1993 | Ehrenfels | |
| 5,531,345 A | 7/1996 | Nakamura et al. | |
| 5,700,977 A | 12/1997 | Ford et al. | |
| 6,653,566 B2 | 11/2003 | Petak et al. | |
| 6,703,562 B1 | 3/2004 | Pacheco | |
| 6,855,887 B1 | 2/2005 | Fox | |
| D502,687 S | 3/2005 | Sherman | |

* cited by examiner

Primary Examiner—Angel R Estrada
(74) Attorney, Agent, or Firm—Heimlich Law; Alan Heimlich, Esq.

(57) ABSTRACT

A method and apparatus for an electrical box repair cover have been described. A cover may be secured to an electrical box by various techniques including straps, clamps, etc. Additionally the cover may secure electrical devices to the electrical box.

5 Claims, 14 Drawing Sheets

Electrical Box Repair - Raised Bracket for Various Cover Accessories

Description:
Cover and bracket design allows exterior power box to be sealed safely in the event of screw or tap damage.
This arrangement gives electrician a quick way to seal a damaged receptacle and continue without having to rewire receptacle or junction box.

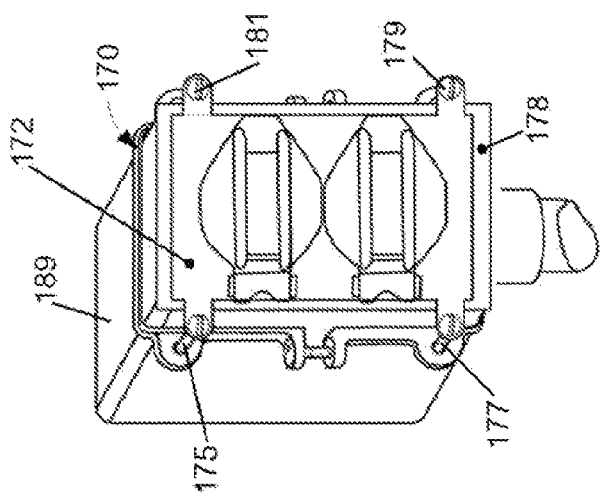
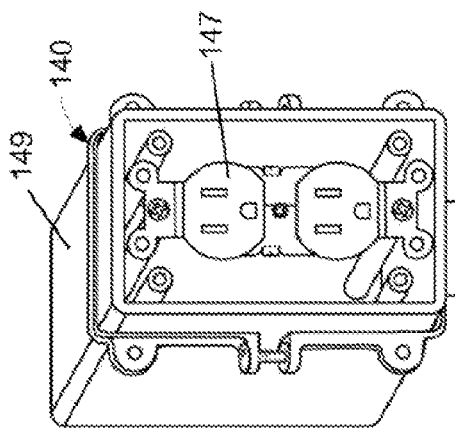
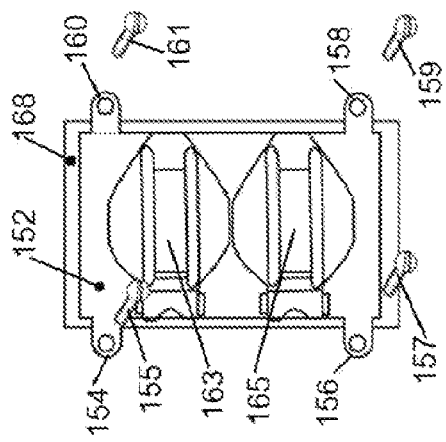
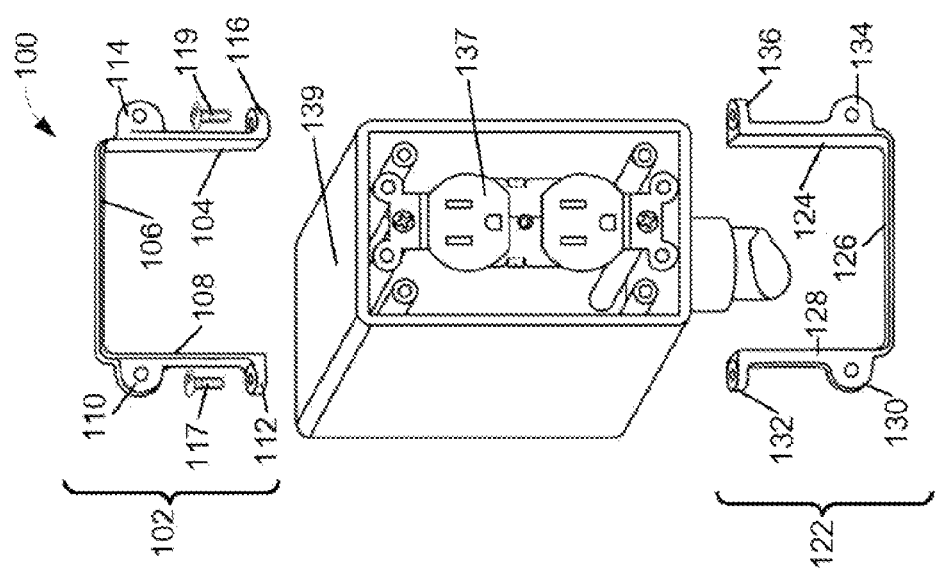

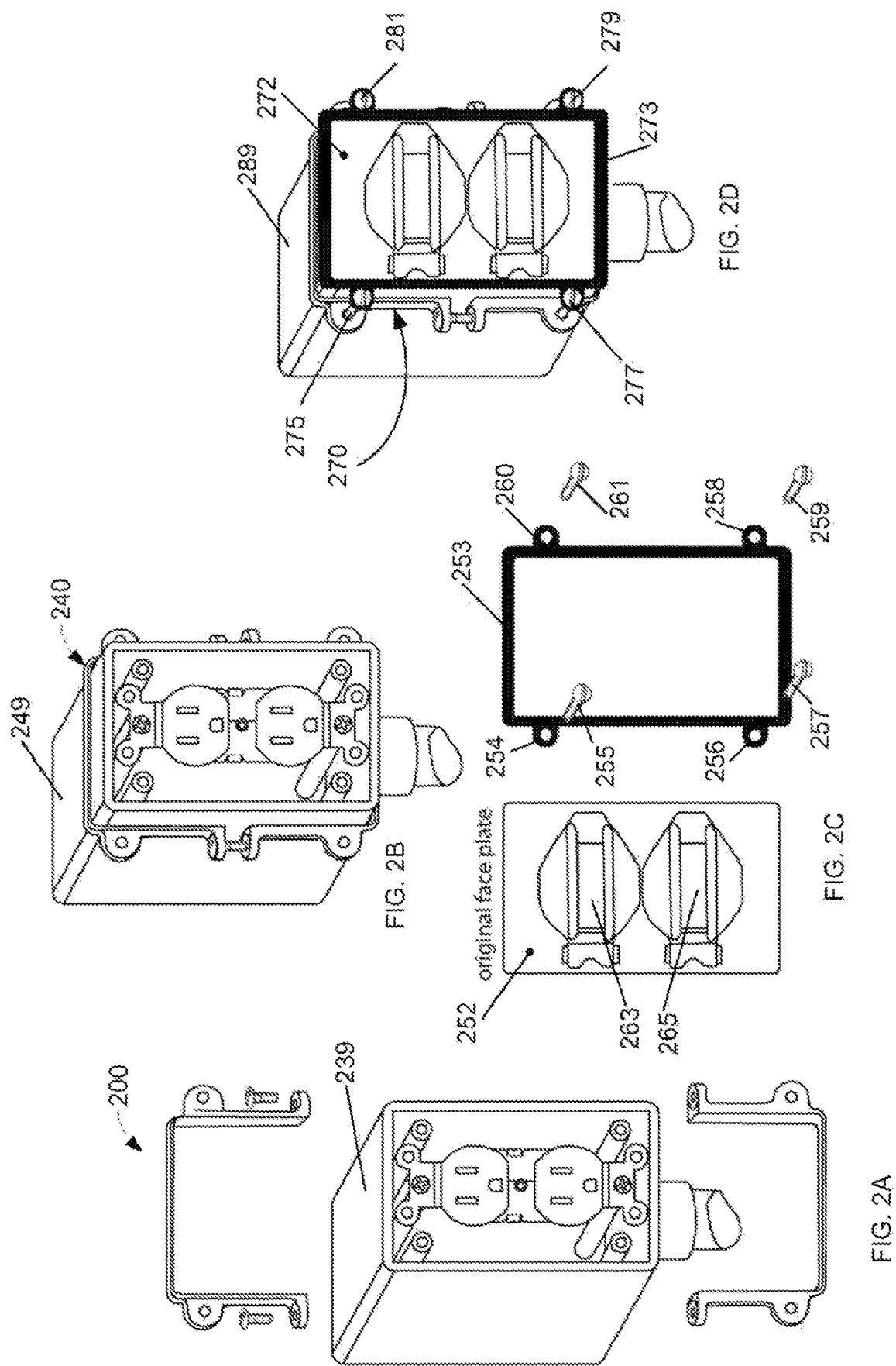

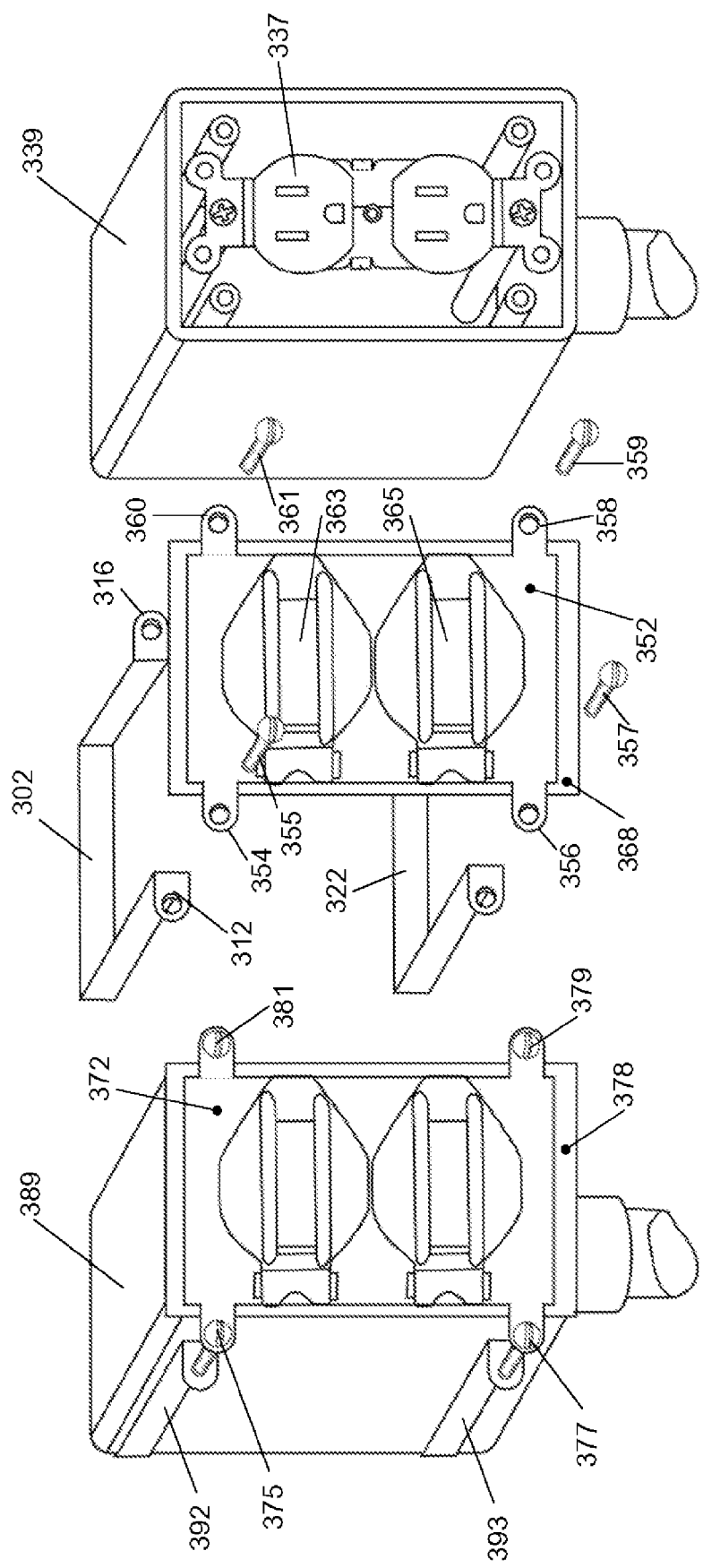

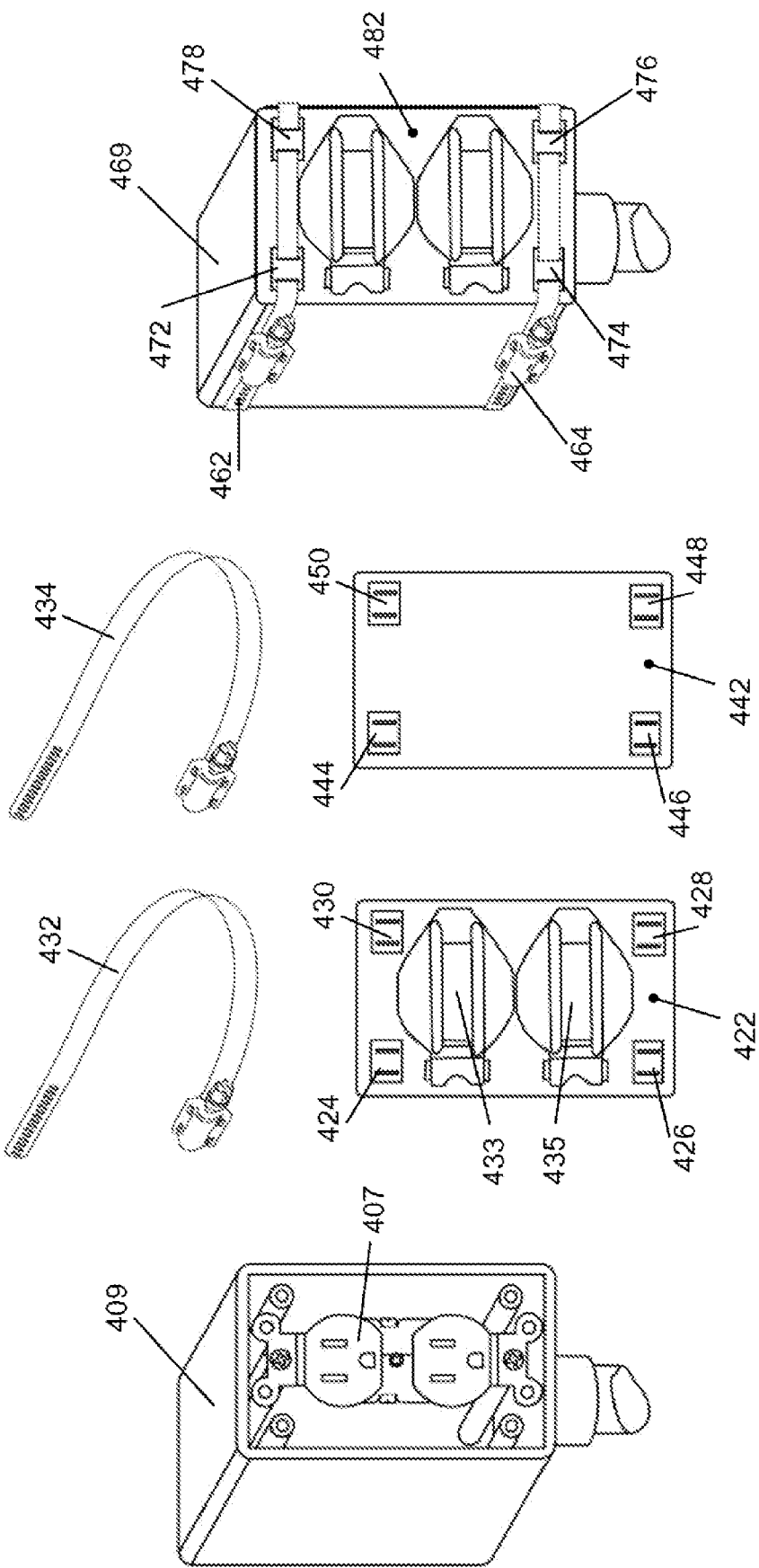

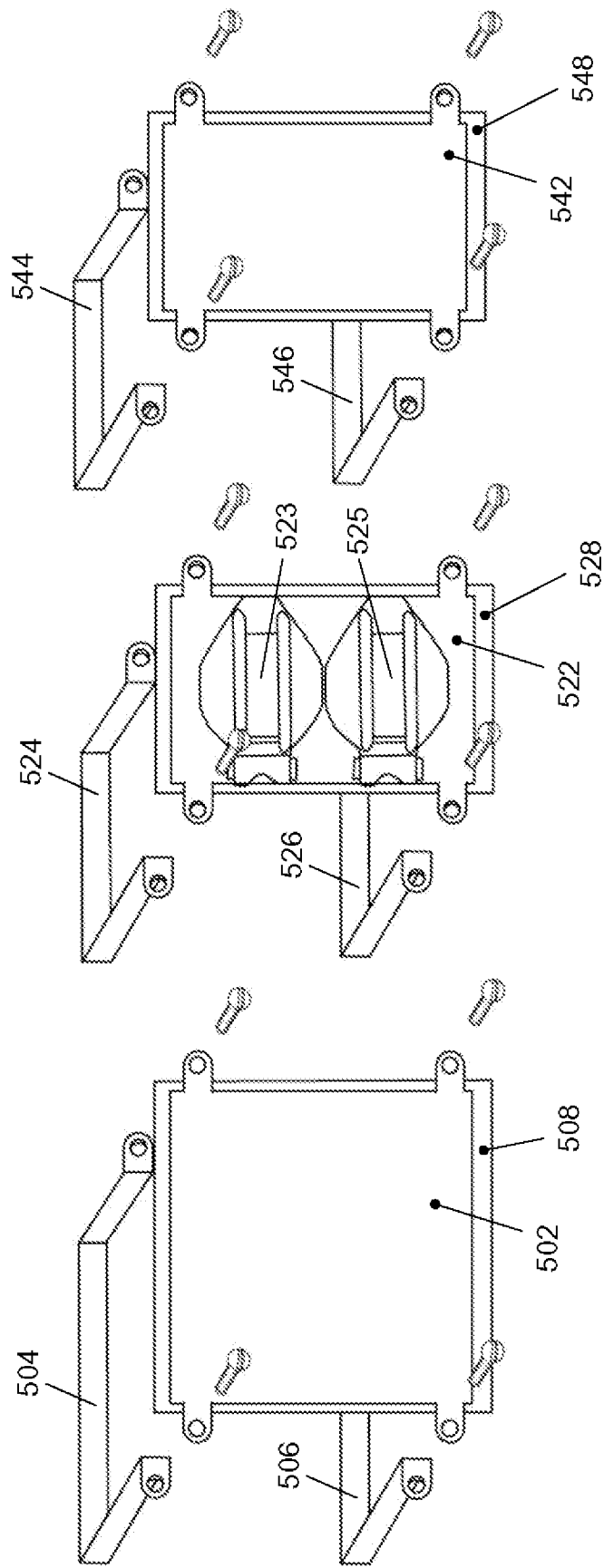

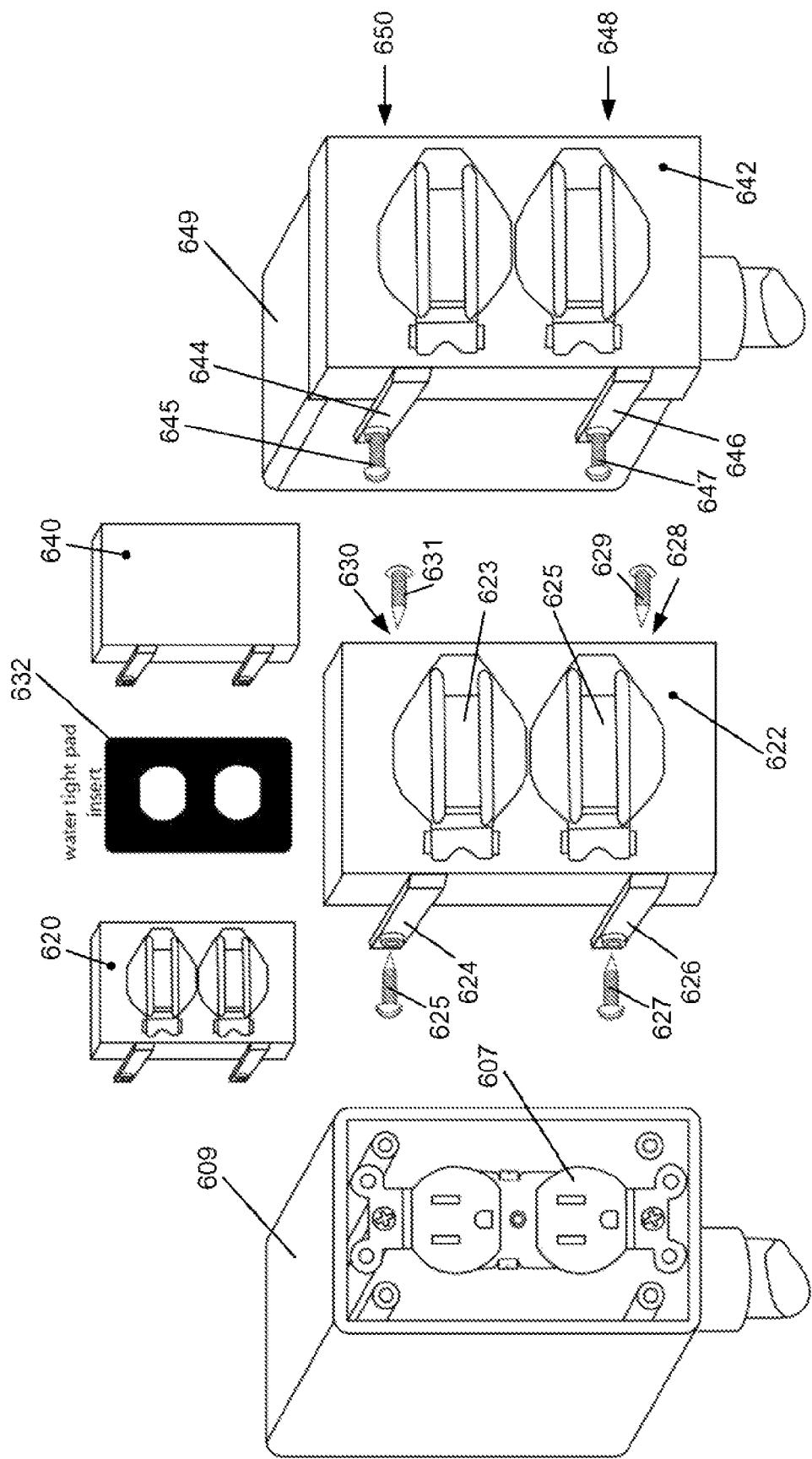

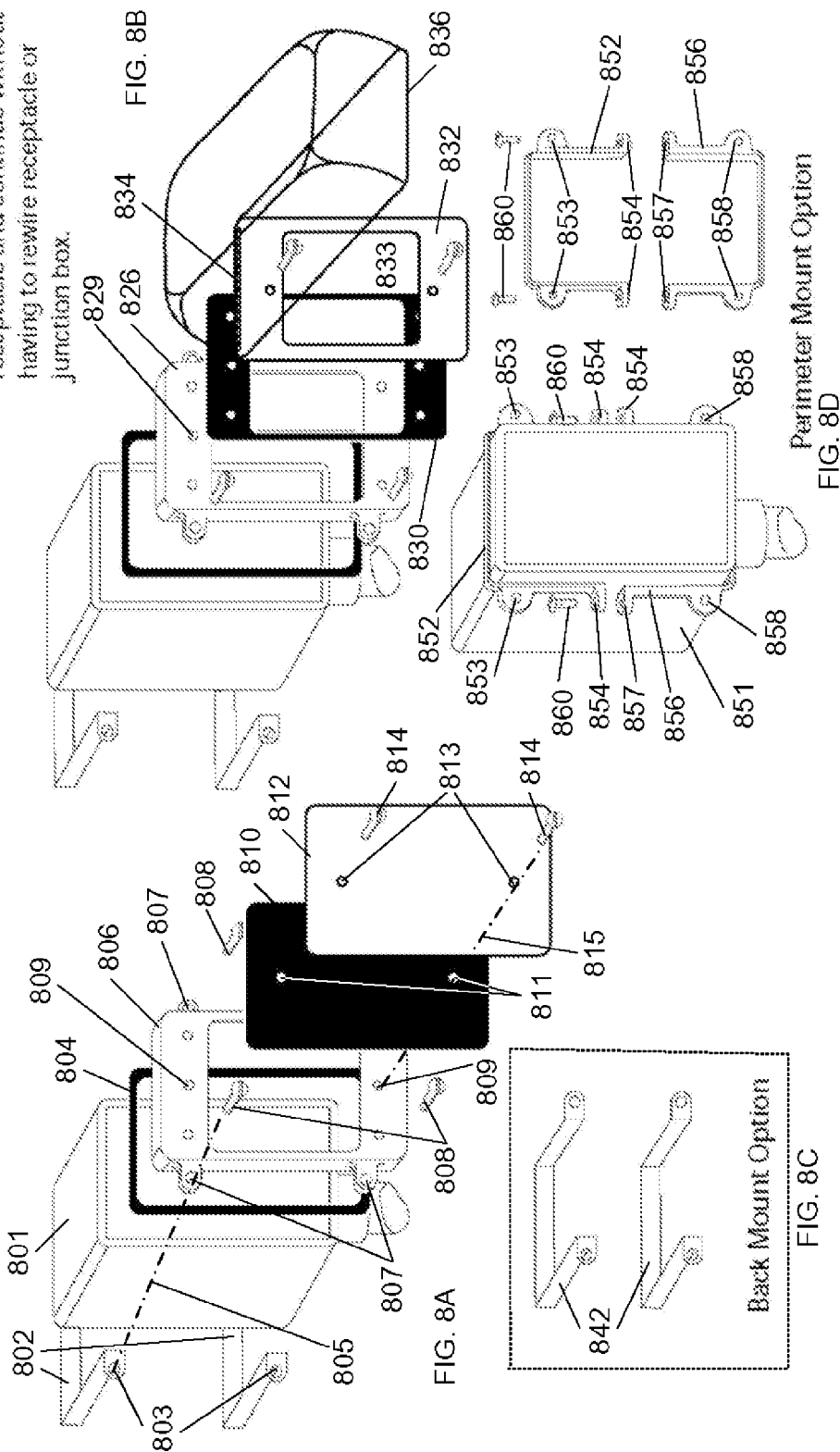

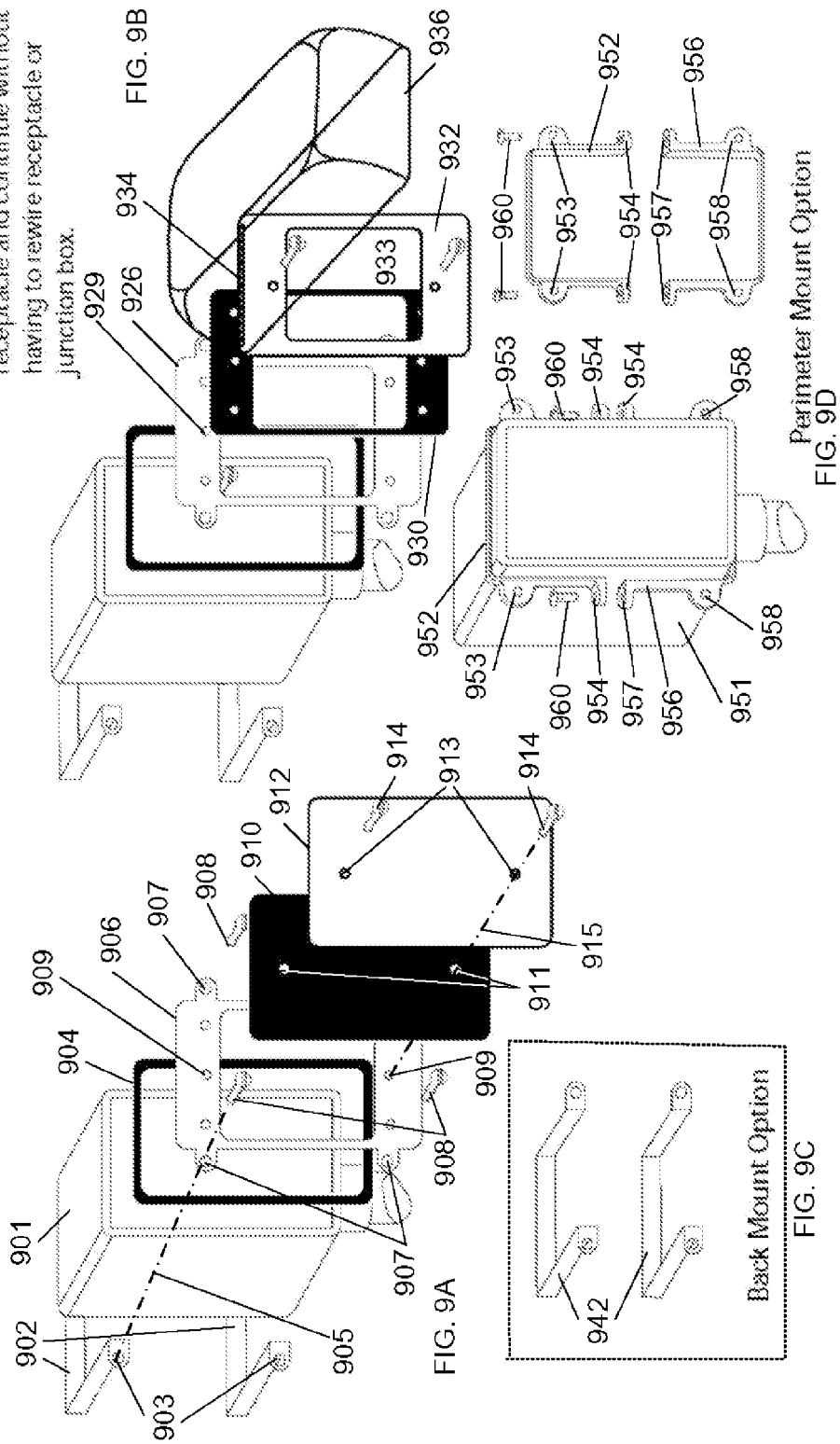

Electrical Box Repair - Piece
Part Graphics
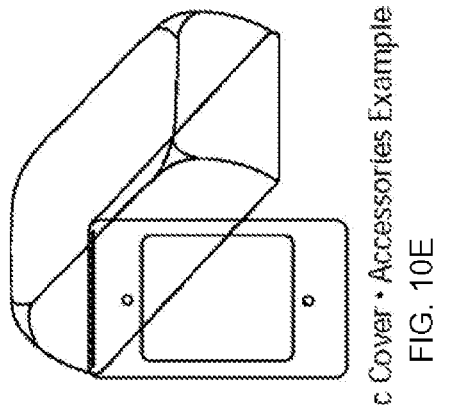
Plastic Cover + Accessories Example
FIG. 10E
FIG. 10I
Screws
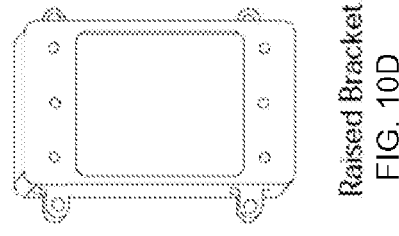
Raised Bracket
FIG. 10D
FIG. 10H
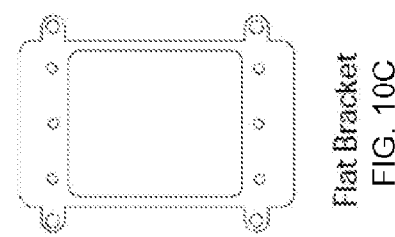
Flat Bracket
FIG. 10C
FIG. 10G
Seals
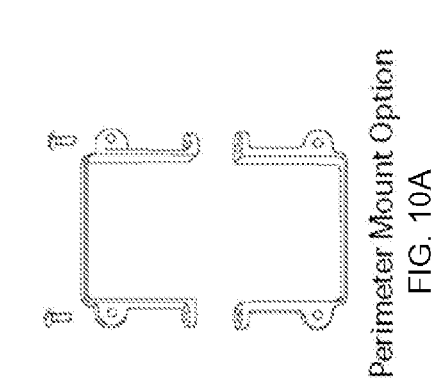
Perimeter Mount Option
FIG. 10A
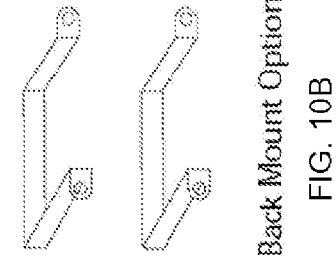
Back Mount Option
FIG. 10B
FIG. 10F

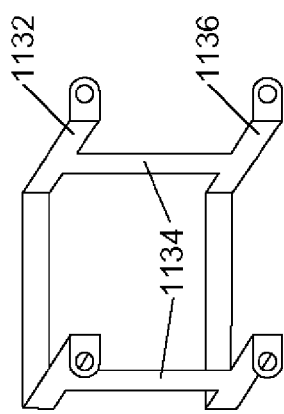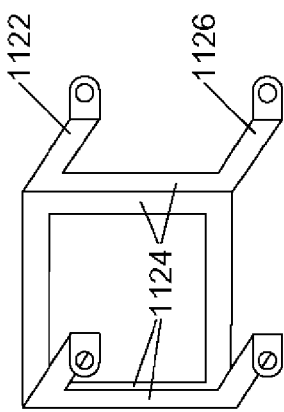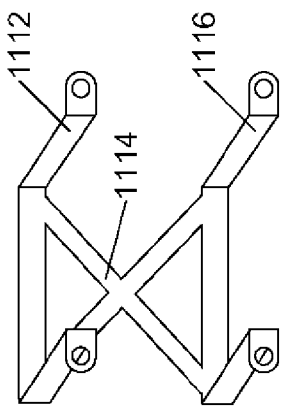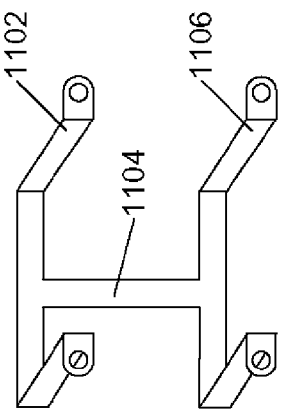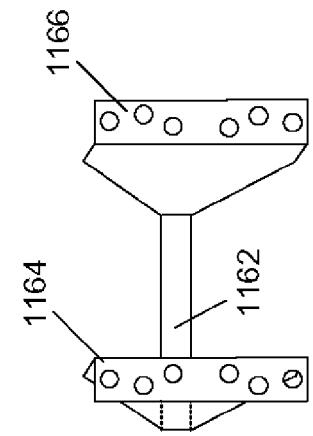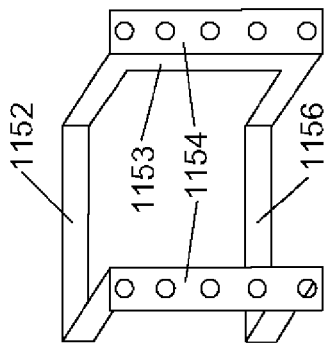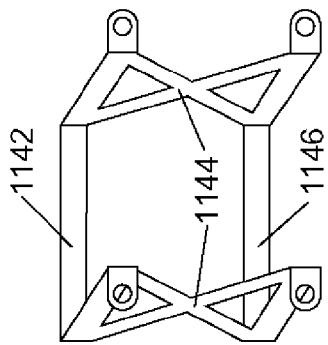

METHOD AND APPARATUS FOR ELECTRICAL BOX REPAIR COVER

RELATED APPLICATION

This patent application claims priority of U.S. Provisional Application Ser. No. 60/744,584 filed 10 Apr. 2006 titled "Method and Apparatus for Electrical Box Repair Cover", which is hereby incorporated herein by reference. This patent application is related to U.S. Pat. No. 7,067,736 granted 27 Jun. 2006 titled "Method and Apparatus for Electrical Box Repair Cover". This patent application is related to U.S. patent application Ser. No. 11/279,704 filed 13 Apr. 2006 titled "Method and Apparatus for Electrical Box Repair Cover".

FIELD OF THE INVENTION

The present invention pertains to electrical boxes also know as junction boxes. More particularly, the present invention relates to a method and apparatus for an electrical box repair cover.

BACKGROUND OF THE INVENTION

Electrical boxes, also known as junction boxes or boxes, are the predominant method for making and terminating electrical connections to other devices, such as, but not limited to switches, outlets, etc.

Often when connecting an electrical device to electrical wiring a cover of some type is used to protect the wiring and/or the device from environmental elements, such as, but not limited to rain, nesting insects, etc.

Sometimes the fastening means for securing the covers to the electrical boxes become inoperative. For example, screws used to fasten a cover to an electrical box may be over tightened resulting in stripped threads or stripping the "boss" into which the screw is treaded. Replacing an electrical box because of stripping is a problem.

Weather and age may also corrode these boxes and covers over time. When screws become corroded and rusted, the heads may break off and as a result there is no way to reattach a cover to a box. If you have multiple conduits and electrical wire running through these boxes, it makes replacing the electrical boxes a very hard and time consuming job. These boxes may still be safe, however, there is no way to attach a cover to them and as a result the box may need to be replaced. This presents a problem.

BRIEF DESCRIPTION OF THE DRAWINGS

The invention is illustrated by way of example and not limitation in the figures of the accompanying drawings in which:

FIG. 1A, FIG. 1B, FIG. 1C, and FIG. 1D illustrates various embodiments of the invention;

FIG. 2A, FIG. 2B, FIG. 2C, and FIG. 2D illustrate one embodiment of the invention also showing use of an unmodified face plate;

FIG. 3A, FIG. 3B, and FIG. 3C illustrate one embodiment of the invention also showing straps around the back of an electrical box;

FIG. 4A, FIG. 4B, and FIG. 4C illustrate one embodiment of the invention also showing strap clamps around the electrical box and a cover;

FIG. 5A, FIG. 5B, and FIG. 5C illustrate various embodiments of the invention also showing some various cover variations;

FIG. 6A, FIG. 6B, and FIG. 6C illustrate one embodiment of the invention also showing a cover with securing legs;

FIG. 8A, FIG. 8B, FIG. 8C, and FIG. 8D illustrate various embodiments of the invention showing a raised bracket with a flat cover, a swing cover, a rear bracket, and a perimeter bracket;

FIG. 9A, FIG. 9B, FIG. 9C, and FIG. 9D illustrate various embodiments of the invention showing a flat bracket with a flat cover, a swing cover, a rear bracket, and a perimeter bracket; and FIG. 10A and 10B illustrate various embodiments of the invention showing mounts, FIG. 10C and 10D illustrate various embodiments of the invention showing brackets (also called covers or face plates), FIG. 10E illustrates one embodiment of the invention showing a plastic swing cover, FIG. 10F, 10G, and 10H illustrate various embodiments of the invention showing seals, and FIG. 10I illustrates screws which may be used with various embodiments of the invention;

FIG. 11A, FIG. 11B, FIG. 11C, FIG. 11D, FIG. 11E, FIG. 11F, and FIG. 11G illustrate various embodiments of the invention showing mounts.

DETAILED DESCRIPTION

Figure 7A:
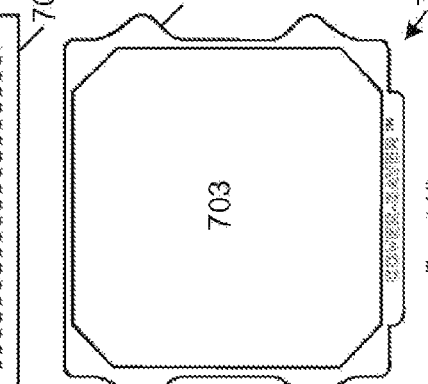
FIG. 7A, FIG. 7B, FIG. 7C, and FIG. 7D illustrate various embodiments of the invention showing a cover, a solid cover, a rear bracket, and a perimeter bracket.

The invention, as exemplified in various embodiments, illustrates a method and apparatus for attaching a cover to an electrical box.

In one embodiment of the invention, an external fastening electrical cover is attached to a damaged electrical box.

In another embodiment of the invention, when original (internal) screws used for securing a cover to an electrical box can no longer be used, external fastening screws and brackets will allow a cover to be safely attached preventing water penetration and/or electrical shock.

FIG. 1A illustrates a clamp mechanism 100 having two rectangular U-shaped sections 102 and 122. Section 102 has legs 104, 106, and 108 that form the U-shape. 102 also has tabs 112 and 116, as well as tabs or ears 110 and 114. Section 122 has legs 124, 126, and 128 that form the U-shape. 122 also has tabs 132 and 136, as well as tabs or ears 130 and 134. Electrical box 139 is shown housing an electrical outlet 137. Clamp 100 sections 102 and 122 may be placed on the outside of electrical box 139. Screw 117 and 119 may then secure sections 102 and 122 via pressure to the outside of the electrical box 139 by the threaded section of screw 117 passing through a hole in tab 112 and being threaded into the tapped hole in tab 132, and by the threaded section of screw 119 passing through a hole in tab 116 and being threaded into the tapped hole in tab 136.

FIG. 1B illustrates clamp 140 secured around electrical box 149 housing an electrical outlet 147.

FIG. 1C illustrates a face plate or cover assembly. Cover 152 has four tabs 154, 156, 158, and 160. In this embodiment, the tabs 154, 156, 158, and 160 have holes that allow the threaded portion of screws 155, 157, 159, and 161 to pass through the respective tabs. In this embodiment, cover 152 also has lids 163 and 165 that may be closed (as shown) to keep environmental elements from entering the electrical box (such as 149). To form a seal against environmental elements a gasket, seal, or pad 168 may be situated between the cover 152 and an electrical box (such as 149).

FIG. 1D illustrates clamp 170 secured to electrical box 189. A gasket 178 is situated between cover 172 and electrical box 189. Cover 172 is drawn tight against electrical box 189 by tightening screws 175, 177, 179, and 181.

FIG. 1A, FIG. 1B, FIG. 1C, and FIG. 1D illustrate how this embodiment of the invention cover and bracket design allows an exterior power box to be sealed safely in the event of screw or tap damage that prevents securing the cover. This arrangement gives an electrician a quick way to seal a damaged receptacle and continue without having to rewire the receptacle or junction box.

FIG. 2A shows clamp 200 having two U-shaped sections that may be fitted over the outside of an electrical box 239.

FIG. 2B shows clamp 240 tightened around electrical box 249.

FIG. 2C illustrates a face plate or cover 252 with lids 263 and 265 that may have been originally used on an electrical box (such as 249) but which now no longer may be attached because of, for example, stripped screw inserts in the electrical box (such as 249). Frame 253 has four tabs or ears 254, 256, 258, and 260 as shown in this embodiment with holes allowing the threaded portions of screws 255, 257, 259, and 261 to pass thorough the respective tabs.

FIG. 2D illustrates clamp 270 secured to electrical box 289. Original faceplate or cover 272 is situated between frame cover 273 and electrical box 289. Cover 272 is drawn tight against electrical box 289 by tightening the frame 273 against the cover 272 via screws 275, 277, 279, and 281.

FIG. 2A, FIG. 2B, FIG. 2C, and FIG. 2D illustrate how this embodiment of the invention cover and bracket design allows an exterior power box to be sealed safely in the event of screw or tap damage. This arrangement gives an electrician a quick way to seal a damaged receptacle reusing the original face plate and continue without having to rewire the receptacle or junction box.

FIG. 3A shows an electrical box 339 housing an electrical outlet 337.

FIG. 3B shows two straps 302 and 322. Shown for strap 302 are tabs 312, and 316. Strap 322 has two tabs, only one of which is shown (not labeled). Cover 352 has four tabs 354, 356, 358, and 360. In this embodiment, the tabs 354, 356, 358, and 360 have holes that allow the threaded portion of screws 355, 357, 359, and 361 to pass through the respective tabs. In this embodiment, cover 352 also has lids 363 and 365 that may be closed (as shown) to keep environmental elements from entering the electrical box (such as 339). To form a seal against environmental elements a gasket, seal, or pad 368 may be situated between the cover 352 and an electrical box (such as 339).

FIG. 3C illustrates straps 392 and 393 secured around electrical box 389. A gasket 378 is situated between cover 372 and electrical box 389. Cover 372 is drawn tight against electrical box 389 by tightening screws 375, 377, 379, and 381.

FIG. 3A, FIG. 3B, and FIG. 3C illustrate how this embodiment of the invention cover and bracket design allows an exterior power box to be sealed safely in the event of screw or tap damage that prevents securing the cover. This arrangement gives an electrician a quick way to seal a damaged receptacle and continue without having to rewire the receptacle or junction box.

FIG. 4A shows an electrical box 409 housing into which an electrical outlet 407 is mounted.

FIG. 4B shows clamps and face plates. Shown are strap clamps 432 and 434. Face plate 422 has lids 433 and 435, and four strap clamp guides 424, 426, 428, and 430. Faceplate 442 has four strap clamp guides 444, 446, 448, and 450.

FIG. 4C shows electrical box 469 with strap clamps 462 and 464 engaged with faceplate 482 (via 472, 478, and 474, 476 for straps 462 and 464 respectively). Face plate 482 may be tightened against electrical box 469 by tightening the strap clamps 462 and 464.

FIG. 4A, FIG. 4B, and FIG. 4C illustrate how this embodiment of the invention cover and bracket design allows an exterior power box to be sealed safely in the event of screw or tap damage that prevents securing the cover. This arrangement gives an electrician a quick way to seal a damaged receptacle using a band fastener and specially made slotted face plate.

FIG. 5A illustrates one embodiment of the invention showing brackets 504 and 506, an optional seal 508, and a multiple gang faceplate 502.

FIG. 5B illustrates one embodiment of the invention showing brackets 524 and 526, an optional sealing gasket 528, and a cover faceplate 522 having two lids 523 and 525 which may cover, for example, electrical outlets.

FIG. 5C illustrates one embodiment of the invention showing brackets 544 and 546, an optional seal 548, and a single gang faceplate 542.

FIG. 6A shows an electrical box 609 into which an electrical outlet 607 is mounted.

FIG. 6B illustrates various embodiments of the invention. 620 illustrates a 2 lid cover faceplate having 4 legs (only 2 shown due to perspective view). 632 illustrates a water tight pad insert. In this illustration pad 632 has cutouts for a two receptacle outlet. Cover 640 has no openings for electrical devices and also has 4 legs (only 2 shown).

Cover 622 has two lids 623 and 625, and 4 legs 624, 626 as shown and two others located at positions shown by arrows 628 and 630 but not shown because of the perspective view. Legs 624, 626, and those at positions 628 and 630, accept screws 625, 627, 629, and 631 respectively.

FIG. 6C illustrates an electrical box 649 with a cover 642 secured to the box 649 by screws 645 (leg 644), 647 (leg 646), and two screws at locations indicated by arrows 648 and 650.

FIG. 7A illustrates one embodiment of the invention, generally at 700. A top view (A) of a cover 701 is illustrated at 702. The cover 701 is illustrated in front view at 704 and has an opening 703. At 706 is a side view (B) of the cover 701 where threaded inserts such as those shown at 708 are fixedly attached to the cover 706 at locations 707. Screws 710 (exploded view at 712) may be threaded into the insert 708 attached to the cover 706 at 707. The cover 701 is shown in a back view at 718. Threaded locations are indicated at 719 in the cover 701. One of skill in the art will appreciate that threaded inserts (such as 708) may be needed in soft materials, such as plastic in order to allow sufficient tightening of the screws (such as 710), however the invention is not so limited, and if, for example, a cover is made of a strong material (e.g. potted metal, steel, etc.) of sufficient thickness then tapped holes (i.e. threaded holes), such as at locations indicated by 719 may be sufficient for securing with screws such as 710. Additionally, if self-tapping screws are used, then locations 719 may be holes sufficient to allow the self-tapping screws to be secured.

Figure 7B:
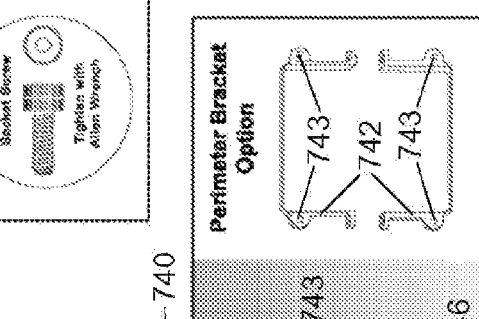

FIG. 7B illustrates one embodiment of the invention, generally at 720, where the cover 722 is solid (i.e. no openings in the face of the cover, as compared with the opening at 703 in cover 704 in FIG. 7A).

Figure 7D:
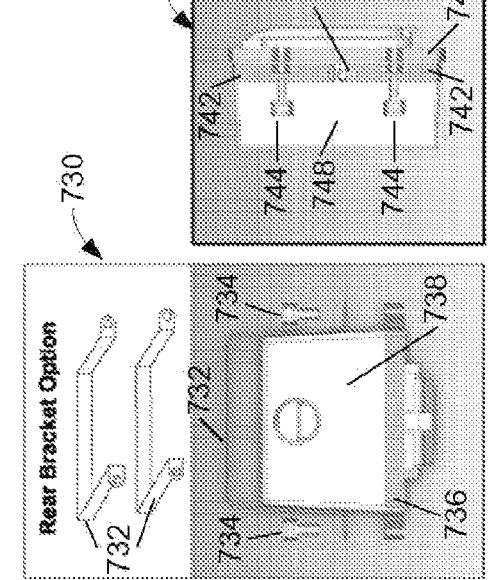
Figure 7C:
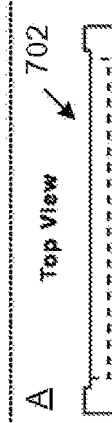

FIG. 7C illustrates one embodiment of the invention, generally at 730, showing rear brackets. At 732 are two U shaped strap brackets. At 738 is an electrical box showing how the brackets 732 are positioned with respect to the box 738, the face plate or cover 736, and the screws 734 which would pass through the holes in bracket 732 and then thread into the face plate 736. Having the screws 734 coming from the rear to attach to the face plate 736 may be more aesthetically pleasing and may assist in preventing the removal of the screws as compared with screws accessible from the front of a cover plate.

FIG. 7D illustrates one embodiment of the invention, generally at 740, showing a perimeter bracket. At 742 are the two U shaped bracket sections forming the perimeter bracket. At 748 is an electrical box showing how the perimeter bracket sections 742 are positioned with respect to the box 748 (and secured to each other with two screws, one such screw shown at 743, the other screw (not visible) on the opposite side of the box), the face plate or cover 746, and the screws 744 which pass through the holes 743 (which may be clear or threaded) in perimeter bracket sections 742 and then thread into the face plate 746.

FIG. 8A illustrates a raised bracket with a flat cover. At 801 is an electrical box, at 802 rear straps having openings 803 (which may be threaded) (two shown, two hidden from view). At 804 is a seal or gasket which seals the front edge of the electrical box 801 and the raised bracket 806. At 806 is a raised bracket having four tabs with holes 807 (only three shown, one hidden from view). Raised bracket 806 is raised from the perspective of not being thin and flat, i.e. 806 has some thickness that raises the front surface of 806 some distance from the front surface edge of the electrical box 801. At 810 is a gasket (having holes at 811) for sealing between raised cover 806 and the cover plate 812. Outer cover plate 812 has two holes at 813. To fasten the raised bracket 806 to the electrical box 801, four screws 808 (one hidden from view) would each pass through a respective tab hole 807 in 806 as illustrated on the upper left tab of 806 along the assembly line 805 and make connection with the corresponding opening 803 in strap 802. Raised bracket 806 has three holes along the top and bottom on the face of 806. That is there is a center hole 809 and holes on either side. To secure the outer face plate 812 to the raised bracket 806, two screws 814 would pass through respective holes 813 in plate 812 and engage with respective hole 809 (which may be tapped) in raised bracket 806 as illustrated, for example, for the lower hole 813 in cover 812 by the assembly line 815.

FIG. 8B illustrates a raised bracket with a swing cover. FIG. 8B is similar to FIG. 8A and so many of the designations are not repeated. However, in FIG. 8B at 830 is a different style gasket having an opening and three holes located at the top and bottom and in alignment with respective holes in raised bracket 826. For example the middle holes in 830 align with the middle holes 829 (one shown) on 826. In FIG. 8B, 832 is a face plate having an opening 833 and a hinge on the upper edge at 834 which is attached to the swing cover 836. The swing cover 836 may cover an electrical device, for example, a switch which is mounted in the electrical box (or on raised bracket 826, or cover 832) and extends through the opening 833 so that a user may, for example, open swing cover 836, flip the switch, and then close swing cover 836.

FIG. 8C illustrates one embodiment of the invention showing a rear bracket. At 742 are two U shaped strap brackets which may be used to secure a raised bracket (e.g. 806 in FIG. 8A) to an electrical box (e.g. 801 in FIG. 8A).

FIG. 8D illustrates one embodiments of the invention showing a perimeter bracket. The perimeter bracket, illustrated unattached on the right side of FIG. 8D) has two U shaped members 852 and 856 having tabs at the end of the U shape 854 and 857 respectively (possibly having holes and possibly tapped), ear tabs 853 and 858 respectively (possibly having holes and possibly tapped) and securing screws 860. The perimeter bracket, illustrated positioned for attachment on the left side of FIG. 8D) has two U shaped members 852 and 856 secured to the electrical box 851 around the perimeter of the electrical box 851 by using screws 860 to pass through hole on the tabs 854 of U member 852 and being secured to the corresponding tabs 857 of U member 856 (which may be tapped). One of skill in the art will appreciate that members such as 852 and 856 may be secured together via a variety of mechanisms. For example, screws and tapped holes, self tapping screws and non-tapped (i.e. smooth) holes, trim clip type connectors, etc.

FIG. 9A illustrates a flat bracket with a flat cover. At 901 is an electrical box, at 902 rear straps having openings 903 (which may be threaded) (two shown, two hidden from view). At 904 is a seal or gasket which seals the front edge of the electrical box 901 and the flat bracket 906. At 906 is a flat bracket having four tabs with holes 907 (only three shown, one hidden from view). Flat bracket 906 is flat from the perspective of being relatively thin and flat, i.e. 906 does not raise the front surface of 906 significantly above the front surface edge of the electrical box 901 (i.e. it is only as thick as needed to securely fasten to the straps (back mount) or perimeter mount). At 910 is a gasket (having holes at 911) for sealing between flat cover 906 and the cover plate 912. Outer cover plate 912 has two holes at 913. To fasten the flat bracket 906 to the electrical box 901, four screws 908 (one hidden from view) would each pass through a respective tab hole 907 in 906 as illustrated on the upper left tab of 906 along the assembly line 905 and make connection with the corresponding opening 903 in strap 902. Flat bracket 906 has three holes along the top and bottom on the face of 906. That is there is a center hole 909 and holes on either side. To secure the outer face plate 912 to the flat bracket 906, two screws 914 would pass through respective holes 913 in plate 912 and engage with respective hole 909 (which may be tapped) in flat bracket 906 as illustrated, for example, for the lower hole 913 in cover 912 by the assembly line 915.

FIG. 9B illustrates a flat bracket with a swing cover. FIG. 9B is similar to FIG. 9A and so many of the designations are not repeated. However, in FIG. 9B at 930 is a different style gasket having an opening and three holes located at the top and bottom and in alignment with respective holes in flat bracket 926. For example the middle holes in 930 align with the middle holes 929 (one shown) on 926. In FIG. 9B 932 is a face plate having an opening 933 and a hinge on the upper edge at 934 which is attached to the swing cover 936. The swing cover 936 may cover an electrical device, for example, a switch which is mounted in the electrical box (or on flat bracket 926, or cover 932) and extends through the opening 933 so that a user may, for example, open swing cover 936, flip the switch, and then close swing cover 936.

FIG. 9C illustrates one embodiment of the invention showing a rear bracket. At 742 are two U shaped strap brackets which may be used to secure a flat bracket (e.g. 906 in FIG. 9A) to an electrical box (e.g. 901 in FIG. 9A).

FIG. 9D illustrates one embodiments of the invention showing a perimeter bracket. The perimeter bracket, illustrated unattached on the right side of FIG. 9D) has two U shaped members 952 and 956 having tabs at the end of the U shape 954 and 957 respectively (possibly having holes and possibly tapped), ear tabs 953 and 958 respectively (possibly having holes and possibly tapped) and securing screws 960. The perimeter bracket, illustrated positioned for attachment on the left side of FIG. 9D) has two U shaped members 952 and 956 secured to the electrical box 951 around the perimeter of the electrical box 951 by using screws 960 to pass through hole on the tabs 954 of U member 952 and being secured to the corresponding tabs 957 of U member 956 (which may be tapped). One of skill in the art will appreciate that members such as 952 and 956 may be secured together via a variety of mechanisms. For example, screws and tapped holes, self tapping screws and non-tapped (i.e. smooth) holes, trim clip type connectors, etc.

FIG. 10A and 10B illustrate various embodiments of the invention showing mounts. FIG. 10C and 10D illustrate various embodiments of the invention showing brackets (also called covers or face plates). FIG. 10E illustrates one embodiment of the invention showing a plastic swing cover. FIG. 10F, 10G, and 10H illustrate various embodiments of the invention showing seals. FIG. 10I illustrates screws which may be used with various embodiments of the invention.

One of skill in the art will appreciate that variations on both the face plate and mounting brackets are possible. For example, plate 812 in FIG. 8A instead of having two holes, one top center and one bottom center, may have for example, four holes: two on the top aligned with the holes on each side of 809 on the top, and two holes on the bottom aligned with the holes on each side of 809 on the bottom. In this variation then cover 812 may be secured to 806 with four screws.

Likewise, variations in the mounting brackets that go around the back of the electrical box are possible. For example, FIG. 11A illustrates one embodiment of the invention showing how an upper strap section 1102 and a lower strap section 1106 are connected via section 1104. FIG. 11B illustrates one embodiment of the invention showing how an upper strap section 1112 and a lower strap section 1116 are connected via a X-shaped section 1114. FIG. 11C illustrates one embodiment of the invention showing how an upper strap section 1122 and a lower strap section 1126 are connected via corner sections 1124. FIG. 11D illustrates one embodiment of the invention showing how an upper strap section 1132 and a lower strap section 1136 are connected via sections 1134 located where the sides of an electrical box would be. FIG. 11E illustrates one embodiment of the invention showing how an upper strap section 1142 and a lower strap section 1146 are connected via X-shaped sections 1144 located where the sides of an electrical box would be. FIG. 11F illustrates one embodiment of the invention showing how an upper strap section 1152 and a lower strap section 1156 are connected via 1153 (one shown, one hidden from view) and front mount sections 1154. Note that 1154 as shown in this embodiment has additional holes for securing a face plate.

While two mounting straps have generally been shown in some embodiments, e.g. FIG. 11A through FIG. 11F, the invention is not so limited and more or fewer straps may be used. For example, FIG. 11G illustrates one embodiment of the invention showing how front mounting sections 1164 and 1166 are joined by a single strap 1162 which would be situated on the rear or back of an electrical box. Note that 1164 and 1166 as shown in this embodiment have additional staggered holes for securing a face plate.

Figure 12B:
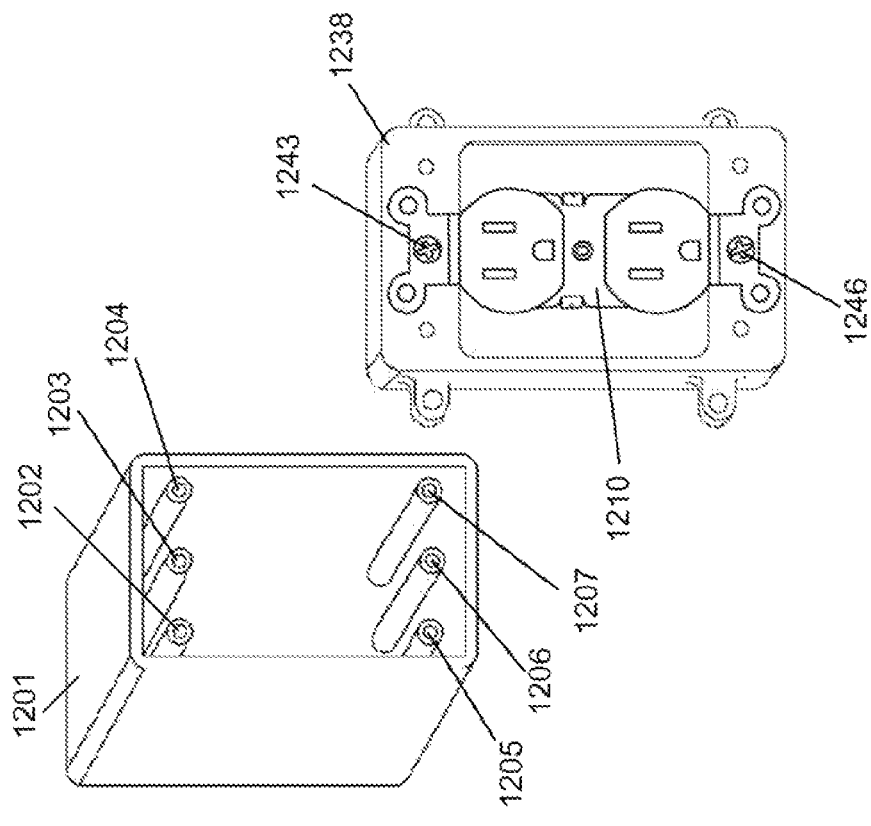
FIG. 12A and FIG. 12B illustrate various embodiments of the invention showing a receptacle mounting.
Figure 12A:
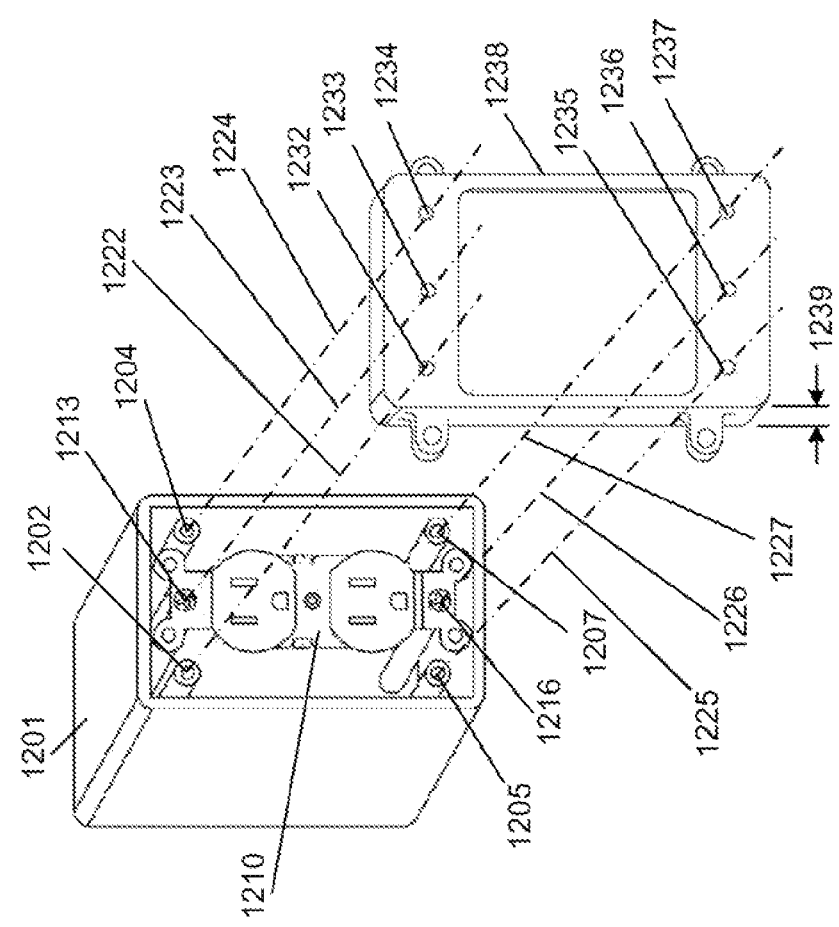

FIG. 12A and FIG. 12B illustrate various embodiments of the invention showing a receptacle mounting. Electrical box 1201 has mounting positions 1202, 1203, 1204, 1205, 1206, and 1207 (see FIG. 12B) for electrical devices, such as a receptacle 1210 which is mounted in FIG. 12A to 1203 by a screw at 1213 and to 1206 by a screw at 1216. Cover plate 1238 having a thickness 1239 has six holes 1232, 1233, 1234, 1235, 1236, and 1237 that line up respectively with the mounting positions 1202, 1203, 1204, 1205, 1206, and 1207 as may be seen by the assembly lines 1222, 1223, 1224, 1225, 1226, and 1227 respectively. In one embodiment of the invention, the face plate, such as 1238 may be used to mount electrical devices, such as a receptacle 1210 in the event that securing an electrical device to, for example, 1203 and/or 1206 becomes inoperative because of, for example, stripped screws (1213 and/or 1216) and/or stripped threads (as in 1203 and/or 1206) or the mounting, such as 1203 and/or 1206 is broken, inoperative, etc. In FIG. 12B is shown receptacle 1210 mounted to cover 1238 via screws 1243 and 1246 which secure to cover 1238 holes 1233 and 1236 (which may be threaded or allow use of nuts and bolts or self-tapping) respectively. Note that plate 1238 has a thickness 1239 which may allow screws 1243 and 1246 clearance so that they do no touch or interfere with mounting 1203 and 1206. Note that for sake of clarity, the perimeter or back mounts for securing 1238 to 1201 are not shown in FIG. 12A and FIG. 12B. One of skill in the art will appreciate that cover 1238 thickness 1239 may be any thickness. For example, it may be shallow to allow for electrical device screw mounting clearance, or may be much deeper so as to extend the volume of the electrical box and cover plate assembly. For example, if the thickness 1239 is the same as the depth of electrical box 1201 it will effectively double the volume in which electrical devices may be mounted and/or allow a much deeper electrical device to be mounted (for example to holes 1232, 1233, 1234, 1235, 1236, 1237 or any combination of these holes).

Figure 13:
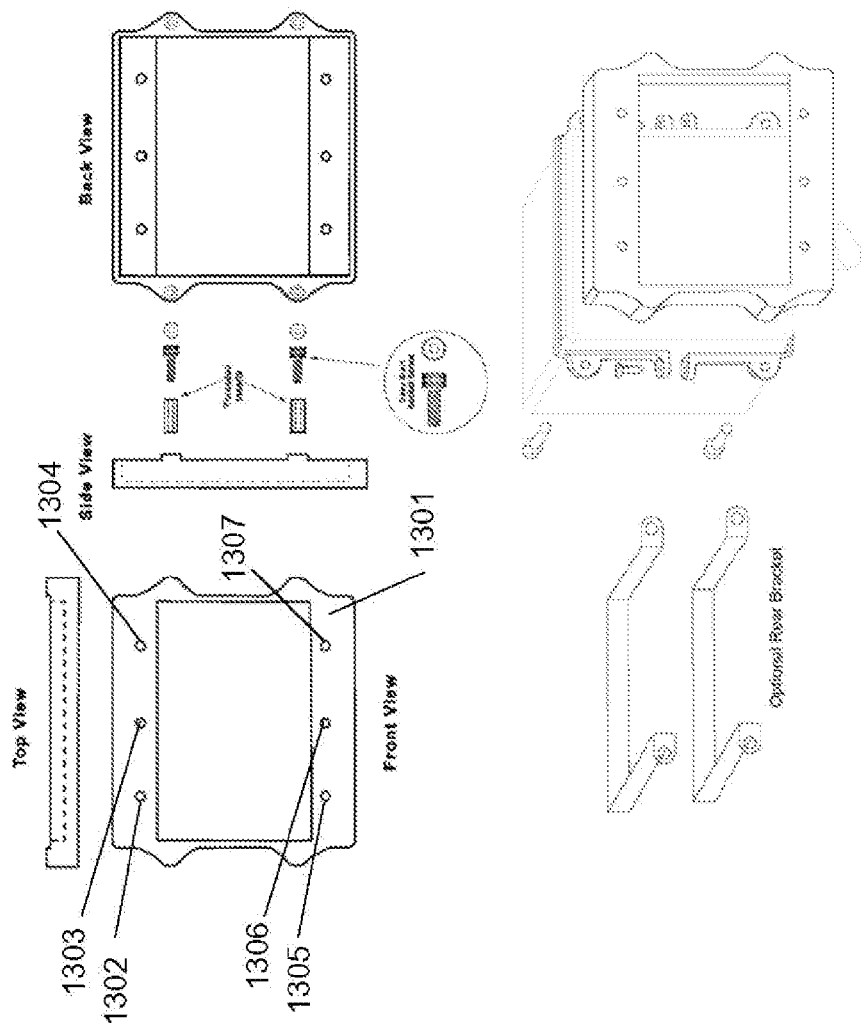
FIG. 13 illustrates one embodiment of the invention showing a larger face plate with six mounting holes.

One of skill in the art will appreciate that electrical devices may be mounted to any of the holes in the face plate (such as 1238). Additionally, more than a single electrical device may be mounted to a face plate. For example, in FIG. 13 face plate 1301 has six mounting holes 1302, 1303, 1304, 1305, 1306, and 1307. For example, in FIG. 13, there may be two receptacles mounted in, for example, holes 1302 and 1305, and 1304 and 1307, respectively. Another example, would be three receptacles mounted in 1302 and 1305, 1303 and 1306, and 1304 and 1307 respectively. Yet another example, may be a switch mounted via holes 1302 and 1305, and two receptacles mounted via, for example, holes 1303 and 1306, and 1304 and 1307, respectively. What is to be appreciated is that the invention is not limited and may have more than six holes, may be of any size and thickness and may have none or multiple openings for electrical devices.

Figure 14:
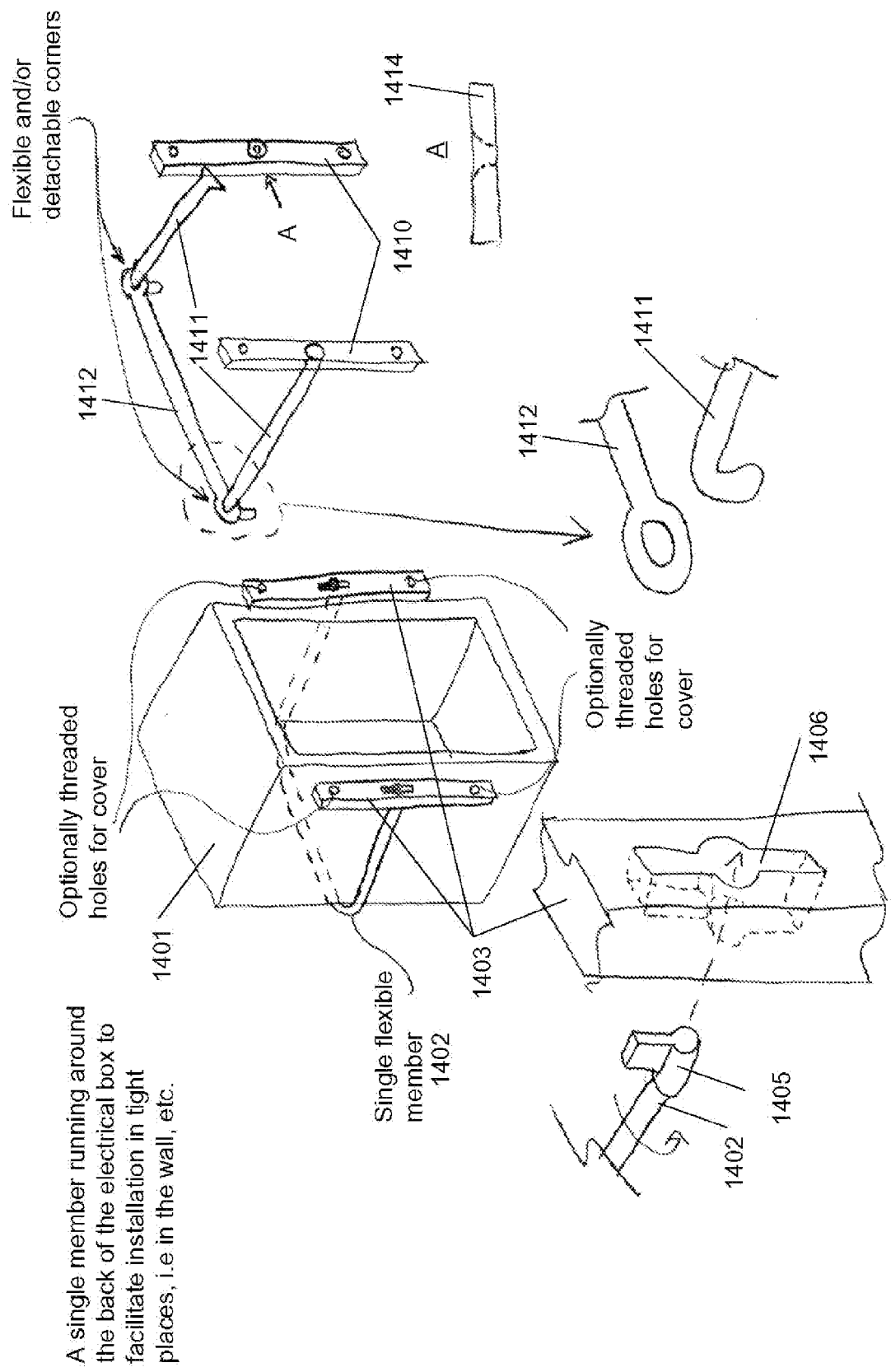
FIG. 14 illustrates various embodiments of the invention showing a single member around the back of an electrical box.

FIG. 14 illustrates various embodiments of the invention showing a single member around the back of an electrical box. At 1401 is an electrical box where a single flexible member 1402 is connected to front brackets 1403 which may optionally have threaded holes. The single member 1402 may be secured to the front brackets via a rotatable member 1405 attached to 1402 and extended through a hole 1406 in bracket 1403 and then rotated to secure it. Note that brackets 1403 may be arched or curved so that any creep or extension in member 1402 may be compensated for. Assembly 1410, 1411, and 1412 show another embodiment wherein a hooking member 1411 is attached to a back portion 1412. Member 1411 may be secured to brackets 1410 via an expanded part of the the memver 1411 as may be seen at cross section A and 1414. What is to be appreciated is that in a situation where it may be difficult to install a more rigid mount a flexible member may be "snaked" around the back of an electrical box and attached to brackets that can then be used to secure a cover to the electrical box. One of skill in the art will appreciate that other embodiments are also possible. For example, if the electrical box itself can be modified and/or manufactured with, for example, hook holes in the sides (or tabs of the sides), then hooks 1411 may be inserted into these holes (or hooked onto the tabs) rather than a member like 1412. In this way the hooks attached to the sides of the electrical box and members 1410 provide for a method of attaching a cover to the electrical box.

While the invention has been illustrated with respect to electrical or junction boxes, the invention is not so limited. The techniques of the invention may be used to secure a cover to a receptacle, box, etc.

One of skill in the art will appreciate that the present invention has many variations only a small sample of which are illustrated in the Figures. For example, referring to FIG. 1, a variation on clamp 100 may be a rectangular clamp requiring only a single screw for closing, for example, in this variation, legs 104 and 124 may be one contiguous leg and screw 117 and tabs 112 and 132 may be the means of tightening variation on clamp 100 to an electrical box.

Other variations may include, but are not limited to, a rectangular frame that may be slid over an electrical box and secured with a cam-like screw mechanism. Another variation is a push-over frame with one-way gripping prongs which when a face plate is secured to it will "dig" into the electrical box. Other variations may include crisscrossing straps around the electrical box, raised bumps for gripping on the straps and/or clamps, straps that go over the top and/or bottom of an electrical box, etc.

While the Figures have illustrated a "free standing" electrical box, the invention is not so limited and my be used on other electrical boxes as well, for example, back mounted, side stud mounted, etc. That is, the invention is not limited to external or exterior electrical boxes and may be used on interior electrical boxes (e.g. located on studs in a wall, ceiling, etc.).

Thus a method and apparatus for an electrical box repair cover have been described.

It is to be understood that the terms "face plate", "cover", "cover assembly", "cover plate", "plate" or similar terms are often used interchangeably. For example, for electrical boxes, a cover may refer to a "plate" with no openings that "covers" an electrical box opening. Similarly a face plate may refer to, for example, a face plate that covers the opening or to a face plate having openings for an electrical device, such as a switch (often called a switch cover or light switch face plate), electrical outlet (receptacle cover), etc. What is to be appreciated is that whatever it is called, it may be affixed via some mechanism to an electrical box.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of skill in the art that the present invention may be practiced without these specific details. In some instances, well-known structures and devices are shown in block diagram form, rather than in detail, in order to avoid obscuring the present invention. These embodiments are described in sufficient detail to enable those of skill in the art to practice the invention, and it is to be understood that other embodiments may be utilized and that logical, mechanical, electrical, and other changes may be made without departing from the scope of the present invention.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for an electrical box repair cover have been described.

What is claimed is:

1. An apparatus comprising:
   one or more peripheral clamps having one or more clamp fastening points, said one or more clamps capable of being situated on a perimeter of an electrical box;
   a raised bracket having one or more bracket fastening points, one or more of said one or more bracket fastening points capable of being engaging with said one or more clamp fastening points;
   a face plate having one or more face plate fastening points, one or more of said one or more face plate fastening points capable of being engaged with said one or more bracket fastening points; and
   a protection lid hingedly attached to one or more of said one or more face plate fastening points.

2. An apparatus comprising a mounting bracket capable of being placed against a back and two sides of an electrical box, said mounting bracket capable of being fastened to a plate such that said plate is held against said electrical box; wherein said mounting bracket further comprises:
   an upper strap having a first side section, a back section, and a second side section such that said first side section is substantially at a right angle to said back section and said second side section is substantially at a right angle to said back section such that said first side section said back section and said second side section form a first substantially square bottomed "U" shape;
   a lower strap having a first side section, a back section, and a second side section such that said first side section is substantially at a right angle to said back section and said second side section is substantially at a right angle to said back section such that said first side section said back section and said second side section form a second substantially square bottomed "U" shape;
   a first joining section joining said upper strap first side section to said lower strap first side section such that the upper strap first side section, lower strap first side section, and said first joining section form a "H" shape; and
   a second joining section joining said upper strap second side section to said lower strap second side section such that the upper strap second side section, lower strap second side section, and said second joining section form a "H" shape.

3. An apparatus comprising a mounting bracket capable of being placed against a back and two sides of an electrical box, said mounting bracket capable of being fastened to a plate such that said plate is held against said electrical box; wherein said mounting bracket further comprises:
   an upper strap having a first side section, a back section, and a second side section such that said first side section is substantially at a right angle to said back section and said second side section is substantially at a right angle to said back section such that said first side section said back section and said second side section form a first substantially square bottomed "U" shape;

a lower strap having a first side section, a back section, and a second side section such that said first side section is substantially at a right angle to said back section and said second side section is substantially at a right angle to said back section such that said first side section said back section and said second side section form a second substantially square bottomed "U" shape;

a first "X" shaped section joining said upper strap first side section to said lower strap first side section; and a second "X" shaped section joining said upper strap second side section to said lower strap second side section.

4. An apparatus comprising a mounting bracket capable of being placed against a back and two sides of an electrical box, said mounting bracket capable of being fastened to a plate such that said plate is held against said electrical box; wherein said mounting bracket further comprises:

an upper strap having a first front section, a first side section, a back section, a second side section, and a second front section such that said first front section is substantially at a right angle to said first side section, said first side section is substantially at a right angle to said back section, said second side section is substantially at a right angle to said back section, and said second front section is substantially at a right angle to said second side section such that said first front section said first side section said back section said second side section and said second front section form a first substantially square bottomed "U" shape with wings;

a lower strap having a first front section, a first side section, a back section, a second side section, and a second front section such that said first front section is substantially at a right angle to said first side section, said first side section is substantially at a right angle to said back section, said second side section is substantially at a right angle to said back section, and said second front section is substantially at a right angle to said second side section such that said first front section said first side section said back section said second side section and said second front section form a second substantially square bottomed "U" shape with wings;

a first section joining said upper strap first front section and said lower strap first front section; and a second section joining said upper strap second front section and said lower strap second front section.

5. An apparatus comprising a mounting bracket capable of being placed against a back and two sides of an electrical box, said mounting bracket capable of being fastened to a plate such that said plate is held against said electrical box; wherein said mounting bracket further comprises:

a strap having a first front section, a first side section, a back section, a second side section, and a second front section such that said first front section is substantially at a right angle to said first side section, said first side section is substantially at a right angle to said back section, said second side section is substantially at a right angle to said back section, and said second front section is substantially at a right angle to said second side section such that said first front section said first side section said back section said second side section and said second front section form a substantially square bottomed "U" shape with wings.

\* \* \* \* \*